June 17, 1924.

C. S. PRESTON 1,498,294

VALVE

Filed Aug. 6, 1923

Inventor
Clarence S. Preston,
By
Attorneys

Patented June 17, 1924.

1,498,294

UNITED STATES PATENT OFFICE.

CLARENCE S. PRESTON, OF SAN DIEGO, CALIFORNIA.

VALVE.

Application filed August 6, 1923. Serial No. 655,961.

*To all whom it may concern:*

Be it known that I, CLARENCE S. PRESTON, citizen of the United States, residing at San Diego, in the county of San Diego and State of California, have invented certain new and useful Improvements in Valves, of which the following is a specification.

This invention relates to valves, and more especially to valves used in connection with the air tubes of pneumatic tires.

The object of the present invention is to provide a valve construction for use in connection with the air tubes of pneumatic tires which will be of air tight construction and one which will act to prevent the escape of air from within the tire.

A further object of the present invention is to provide a yieldable washer for use in connection with such a valve which will act as an air seal, the sealing effectiveness of which will be increased with increase of pressure thereon.

Further objects and advantages of the invention will appear from the following description taken in connection with the accompanying drawings which illustrate a preferred embodiment of the invention, and in which—

Figure 1:
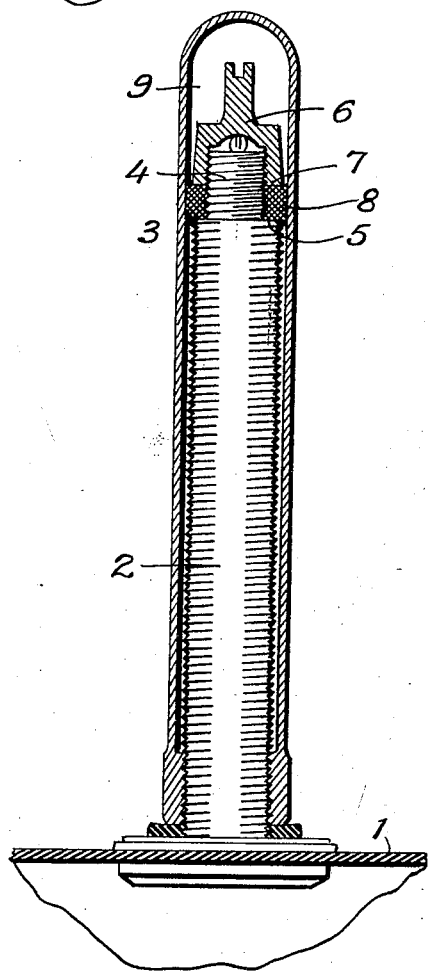
Figure 1 is a longitudinal section of a valve and air tube embodying the present invention.
Figure 2:
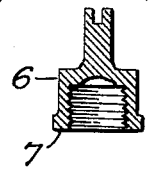
Fig. 2 is a sectional view of an air cap comprising a part of the invention.

Referring in detail to the drawings, the reference numeral 1 indicates generally the inner air tube of a pneumatic tire which is, as shown, provided with the projecting air tube 2, having the usual air passage therewithin and provided with any usual or preferable inner valve construction.

The air tube 2 is externally screw threaded, as shown, to receive an internally screw threaded dust cap 3 thereon in the usual manner.

The air tube 2 is, as shown, provided with a reduced portion 4 at its end somewhat elongated for a purpose which will be presently described. The air tube 2 is provided with shoulders 5 at the point where the extension 4 begins. The projection or extension 4 is externally screw threaded to receive thereover an internally screw threaded air cap 6, which may be provided with the usual outer valve engaging end. The inner end of said air cap 6 is provided with a relatively large annular flat surface 7 for the purpose of smoothly engaging one side of a washer 8 which is preferably composed of leather, rubber or other yieldable substance.

The other side of said washer 8 abuts against the shoulders 5 formed upon the air tube.

It will be observed that the external diameter of the air cap 6 at the point where it engages the washer 8 is somewhat less than the external diameter of said washer and that the outer annular surface of said washer extends outwardly in a radial direction, substantially in alignment with the screw threads formed on the air tube 2.

It will be observed that the screw threaded projection 4 is long enough to allow the washer 8 to be placed over it in tight frictional engagement therewith and yet allow a sufficient portion to extend beyond said washer to permit engagement of a coupling member with said projection 4 for the purpose of filling the inner tube 1 with air.

Figure 3:
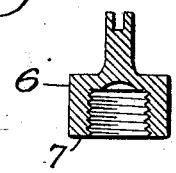
Figs. 3 and 4 are sectional views of modified forms of such caps.
Figure 4:
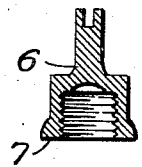

Modified forms of the air cap 6 are illustrated in Figures 3 and 4. It will be observed that the external diameter of the air cap 6 is small enough to enable it to fit easily within the dust cap 3 and that in each instance the air cap 6 is provided with the relatively large annular end portion 7 for tight frictional engagement with the yieldable washer 8 without cutting or mutilating it.

The operation of the device is as follows: When it is desired to fill the inner tube with air the dust cap 3 is unscrewed and removed from connection with the air tube 2. The air cap 6 is then unscrewed leaving the washer 8 in position upon the projection 4. The connection with a source of air supply is then made in the usual manner and the air coupling removed when the air in the inner tube has reached the desired pressure. The air cap 6 is then screwed into place with its shoulders 7 abutting against the washer 8, which in turn abuts against the shoulder 5 formed on the air tube 2. The dust cap 3 is then screwed into place over the washer 8 and into screw threaded engagement with the air tube 2. It will be observed that the washer 8 is in close frictional engagement with the inner wall of the dust cap 3 when said dust cap has been screwed into its position on the air tube. The air tube 2 may or may not be internally screw threaded for the greater part of its length and the washer 8, when the air tube 2 is in position, may engage either internal screw threads or smooth walls on the inner surface of said dust cap.

It will be seen that whatever air leaks out beyond the valve will enter into the chamber 9 in the end of the dust cap 3 and that any air pressure in said chamber 9 will be exerted against that portion of the yieldable washer 8 which protrudes radially beyond the shoulder 7 on the air cap and that the greater this pressure is the more will the yieldable washer 8 be pressed into tight engagement with the adjacent inner wall of the dust cap 3.

I claim—

1. A valve for pneumatic tires comprising an air tube provided with a shoulder and a projection extending therebeyond, a valve in said air tube, an air cap removably secured to said projection and having a flat base portion of relatively large area, and a yieldable washer on said projection between said shoulder and base portion and having a greater external diameter than said base portion and said shoulder.

2. A valve for pneumatic tires comprising an air tube provided with a shoulder and a projection extending therebeyond, a valve in said air tube, an air cap removably secured to said projection and having a flat base portion of relatively large area, a dust cap enclosing said air cap and air tube, and a yieldable washer between said base portion and said shoulder and adapted to contact with the inner wall of said dust cap.

3. A valve for pneumatic tires comprising an air tube provided with a reduced extension, a valve in said air tube, an air cap removably secured to said extension, a dust cap enclosing said air cap and said air tube, and a yieldable washer arranged upon said reduced extension and below said air cap and adapted to contact with the inner wall of said dust cap.

In testimony whereof I affix my signature.

CLARENCE S. PRESTON.